R. D. TURNER.
Apparatus for Treating Alcoholic Liquids in Spray with Ozone, for Ageing and the Production of Vinegar.
No. 136,470. Patented March 4, 1873.
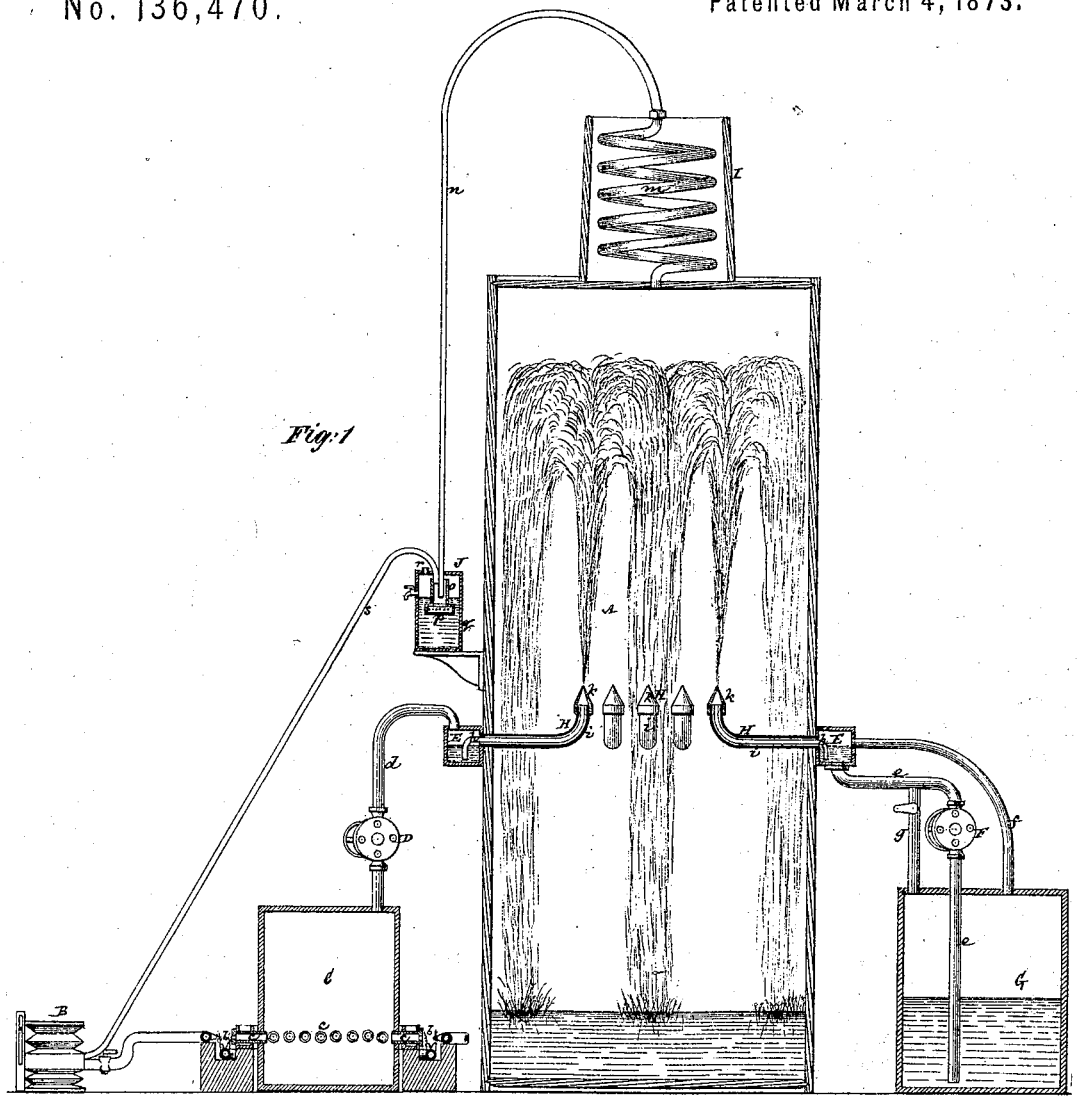
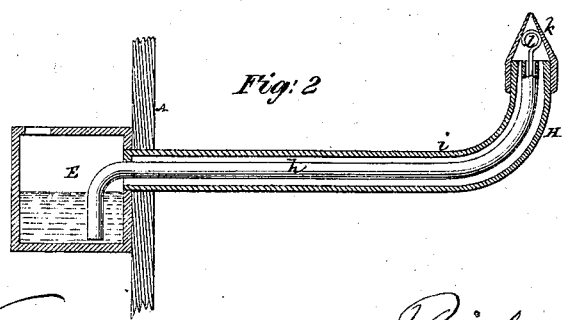

UNITED STATES PATENT OFFICE.

REUBEN D. TURNER, OF NEW YORK, N. Y.

IMPROVEMENT IN APPARATUS FOR TREATING ALCOHOLIC LIQUIDS IN SPRAY WITH OZONE FOR AGING AND THE PRODUCTION OF VINEGAR.

Specification forming part of Letters Patent No. 136,470, dated March 4, 1873.

*To all whom it may concern:*

Be it known that I, REUBEN D. TURNER, of the city, county, and State of New York, have invented a new and useful Improvement in Apparatus for Aging or Improving Spirituous Liquors, also applicable to the Manufacture of Vinegar; and I do hereby declare that the following is a full, clear, and exact description of the same, reference being had to the accompanying drawing forming part of this specification, and in which—

Figure 1 represents a sectional elevation of an apparatus having my invention applied and as adapted to the aging or improving of spirituous liquors. Fig. 2 is a sectional view, upon a large scale, of a spraying device for jointly distributing the liquid to be treated and ozonized air or gas to act upon the same, such spraying device forming one of the details of the apparatus.

Similar letters of reference indicate corresponding parts.

This invention relates to apparatus for aging and improving whisky and other spirituous liquors—also for manufacturing vinegar—by exposing the liquid to be treated, when broken up into spray, to the oxidizing influence of ozonized air or gas, which is or may be produced by passing a current of atmospheric air through a flame, and causing the product to be passed by induction-tubes into the chamber or vessel within which it is required to collect the ozone. The improvement consists in a novel construction and combination of parts, whereby the liquid to be treated is sprayed conjointly with the ozonized air or gas up within the apparatus or tank forming the body thereof, said ozonized air first being collected in a separate chamber, and the liquid to be treated in another chamber or close trough, to which it may be pumped up, and from whence it is expelled through the spraying tubes or devices of the apparatus, by and in common with a forced current of the ozonized air.

Referring to the accompanying drawing, A represents an upright tank or vessel, in which the liquid to be treated is injected in the form of spray along with ozonized air or gas. The ozone is produced, as hereinbefore referred to, by blowing atmospheric air, through the action of any suitable blower, B, through a series of gas-jets, $b$, and causing the product to be passed by induction-tubes $c$ into a receiver or vessel, C, which is, in the present invention, a separate receptacle from the tank A. The ozonized air or gas thus collected within the vessel C is drawn or forced from thence by a pump, D, and pipe $d$ into the upper portion of a closed trough or receiver, E, arranged around or on one or more sides of the tank A, and at a level which is intermediate of the height of the latter. The liquid to be treated is also pumped up by a pump, F, and pipe $e$ from a vessel, G, into the closed trough E to a level which is controlled by an overflow-pipe, $f$, that returns surplus to the vessel G. The supply-pipe $e$ is further connected, subject to control by cock, with the vessel G by a branch, $g$, for draining the trough E when required. The liquid to be treated and the ozonized air or gas being thus introduced within the closed trough E, said liquid is sprayed up within the tank A by the pressure of the ozonized air or gas as the latter is forced by the pump D into the upper portion of the trough E, and a certain proportion of the ozonized air or gas also liberated along with the sprayed liquid within the tank. This is done by a number of spraying tubes or devices, H, each of which is composed of an inner pipe, $h$, an outer pipe, $i$, and nozzle $k$, with a divider, $l$, within the nozzle and contiguous end of the inner pipe, the latter pipe dipping down into the liquid within the trough, and the outer pipe communicating with the trough above the level of the liquid, and both pipes communicating at their inner ends with the nozzle, which is arranged to inject upward, so that the ozonized air or gas and liquid meet within the latter, and are distributed or sprayed out in common up within the tank or vessel A, in the bottom of which the treated liquid finally settles, and is drawn off as required.

When the apparatus is used for aging or improving spirituous liquors there may be mounted on top of the tank A, as in another apparatus for the like purpose invented by me, a condenser, I, having a worm, $m$, which is in open communication at its one end with the tank for the purpose of returning to the tank alcoholic matter that otherwise would pass off; said worm $m$ also being connected at its outer end, by a dip-pipe, n, with a device, J, for preventing back action of the ozonized air in the tank by the liquor as it descends within the latter. This device J consists of a tubular stem, o, carrying a stationary perforated hollow disk, p, submerged in a water-chamber, g, that is provided with an air-escape, r, and with a blow-pipe, s, arranged to project down within the hollow stem o, and connected at its opposite end with the blower B, so that air blown through the pipe s will be forced out through the perforated disk p and caused to produce a suction or draft on the lower end of the dip-pipe n, thereby giving a gentle upward relief to the ozonized air in the tank, and preventing back action, as required. The device J, to which no claim is here made, also serves to catch any volatile alcoholic matter passing off from the condenser I.

For making vinegar the condenser I is omitted, and, if the device J is applied, the dip-pipe n is connected at its upper end directly with the tank A.

What is here claimed, and desired to be secured by Letters Patent, is—

The combination, with the tank A, of the separate ozone-receptacle C, the vessel G containing the liquid to be treated, the pumps D F, the closed trough or receiver E, into which both the liquid and ozonized air are pumped, and the spraying tubes or devices H for distribution of the liquid by pressure of the ozone and in common with it within the tank, substantially as specified.

REUBEN D. TURNER.

Witnesses:
MICHAEL RYAN,
F. HAYNES.